United States Patent
Emer et al.

(12)

(10) Patent No.: US 6,470,443 B1
(45) Date of Patent: Oct. 22, 2002

(54) PIPELINED MULTI-THREAD PROCESSOR SELECTING THREAD INSTRUCTION IN INTER-STAGE BUFFER BASED ON COUNT INFORMATION

(75) Inventors: Joel S. Emer, Acton; Rebecca Stamm, Wellesley; Trggve Fossum, Northborough; Robert H. Halstead, Jr., Belmont; George Z. Chrysos, Marlboro, all of MA (US); Dean Tullsen, San Diego, CA (US); Susan Eggers; Henry M. Levy, both of Seattle, WA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/526,137

(22) Filed: Mar. 14, 2000

Related U.S. Application Data

(62) Division of application No. 08/775,553, filed on Dec. 31, 1996, now Pat. No. 6,073,159.

(51) Int. Cl.[7] .............................................. G06F 15/00
(52) U.S. Cl. ....................................................... 712/205
(58) Field of Search ................................. 709/102, 103, 709/104

(56) References Cited

U.S. PATENT DOCUMENTS

| | | | | | |
|---|---|---|---|---|---|
| 5,809,450 | A | * | 9/1998 | Chrysos et al. | 702/186 |
| 5,974,438 | A | * | 10/1999 | Neufeld | 709/104 |
| 6,018,759 | A | * | 1/2000 | Doing et al. | 709/108 |
| 6,052,708 | A | * | 4/2000 | Flynn et al. | 709/108 |
| 2001/0056456 | A1 | * | 12/2001 | Cota-Robles | 709/103 |

* cited by examiner

Primary Examiner—Kenneth S. Kim
(74) Attorney, Agent, or Firm—Sharp, Comfort & Merrett, P.C.

(57) ABSTRACT

A multi-threaded processor comprising a pipeline including a number of stages processing instructions belonging to a plurality of threads. A buffer stores instructions from different ones of the threads. Count logic stores count information relating to each of the threads to indicate the number of instructions in each of the corresponding threads that have a particular attribute. A selection logic circuit has an output coupled to the buffer to determine which instruction is to be read from the buffer based on the count information stored by the count logic. The count information may, for example, provide information relating to a likelihood that one or more instructions belonging to each of the threads will be cancelled; relating to a count of unresolved branch instructions; or relating to a count of outstanding data cache misses. In operation, a thread may be selected for execution based on a selected attribute to enhance processing performance.

8 Claims, 6 Drawing Sheets

PIPELINED MULTI-THREAD PROCESSOR SELECTING THREAD INSTRUCTION IN INTER-STAGE BUFFER BASED ON COUNT INFORMATION

This application is a divisional of application Ser. No. 08/775,553, filed Dec. 31, 1996, (U.S. Pat. No. 6,073,159).

BACKGROUND OF THE INVENTION

This invention relates generally to computer systems and more particularly to the implementation of simultaneous multithreading in an out-of-order execution, superscalar central processing unit (CPU).

One type of CPU is an in-order execution CPU. In an in-order execution CPU, instructions in an instruction stream are executed in the order in which they occur in the instruction stream. In an out-of-order execution CPU, instructions in the instruction stream are identified which are not dependent upon other instructions in the instruction stream. These identified instructions are executed in the CPU out of order from the order in which the instructions occur in the instruction stream. This out-of-order execution of instructions typically results in a higher performance CPU.

A CPU can also be either scalar, issuing a single instruction each instruction cycle or superscalar, issuing multiple instructions, in parallel, in each instruction cycle. By issuing multiple instructions in a single cycle, a superscalar processor typically provides a user with higher performance.

Multithreading is an additional technique which may be implemented to improve CPU performance in which multiple threads are resident in the CPU at one time. A thread is typically defined as a distinct point of control within a process or a distinct execution path through a process where a single process may have multiple threads. Through context switching, the CPU switches between these threads, allocating system resources to each thread in turn, in order to improve the rate of instruction throughput. The higher rate of instruction throughput is achieved by providing higher utilization of the various functional units by taking advantage of the independence of the instructions from the various threads. In simultaneous multithreading, instructions from multiple threads are executed during each cycle, dynamically sharing system resources and further improving instruction throughput.

A technique for improving the performance of a superscalar processor through simultaneous multithreading is provided in the paper Performance Study of a Multithreaded Superscalar Microprocessor by Manu Gulati and Nader Bagherzadeh which was presented at the 2nd International Symposium on High Performance Computer Architecture on Feb. 5, 1996. In Performance Study of a Multithreaded Superscalar Microprocessor, Gulati and Bagherzadeh present an architecture which supports simultaneous multithreading in an out-of-order execution, superscalar processor and provide three different fetch policies which describe mechanisms by which control of the CPU is shared between the multiple threads executing within the processor.

One fetch policy mechanism presented by Gulati and Bagherzadeh for identifying instructions for fetch each cycle, is referred to as the True Round Robin policy. In the True Round Robin policy, a fetch cycle is allocated to each thread. Instructions fetched in a single cycle all belong to the same thread. Instructions fetched in different cycles however belong to different threads. A Modulo N (N=number of threads) binary counter is provided which is incremented each fetch cycle. The thread with an ID equal to the value of the counter is allowed to fetch a block of instructions during that cycle.

A Masked Round Robin policy described by Gulati and Bagherzadeh, is similar to the True Round Robin except one or more threads can be skipped in a fetch cycle. A thread is skipped if the thread is temporarily suspended, due, for instance, to synchronization delay.

The final fetching policy described by Gulati and Bagherzadeh is referred to as the Conditional Switch policy, which is another variation on the basic round robin fetching scheme. In the Conditional Switch policy, fetching is continued from a single thread until there is an indication that its rate of execution may become low. An indication of a thread's rate of execution possibly becoming low is determined by an instruction decoder when one of four types of instructions is detected, specifically, an integer divide, a floating point multiply or divide, a synchronization primitive or a long-latency I/O operation. Upon detecting one of these operations, the decoder sends a switch signal to the fetch mechanism indicating that the rate of execution of the current thread may become low and thus instructions in the subsequent fetch cycle should be fetched from the next thread.

A problem with the True Round Robin, Masked Round Robin and Conditional Switch policies presented by Gulati and Bagherzadeh is that the instructions from a slowly executing thread will build up in the various queues and clog them, thus preventing execution of instructions of other threads.

Under the True Round Robin policy, threads are selected in succession with no regard to the actual performance of the particular thread selected. Therefore, this scheme would be prone to queue clog. Under the Masked Round Robin policy, actual execution rate of a thread is not monitored but rather guesses are made in relation to delays in committing instructions from a particular thread. Finally, clogging of the queues occurs in a scheme such as the Conditional Switch policy because actual execution time of a thread is not monitored but rather, only guesses are made as to which thread's execution rate may be becoming low. Accordingly, there is no real runtime feedback to the system which would enable it to select a more suitable thread from which to execute instructions.

SUMMARY OF THE INVENTION

In accordance with the present invention, a technique is provided for selecting at least one preferred thread from a plurality of threads executing within a simultaneous multithreaded computer system, said at least one preferred thread possessing those instructions which, while in flight within a pipeline of the simultaneous multithreaded, out-of-order execution computer system provide, in contrast to those instructions belonging to others of said plurality of threads, a more beneficial performance of the central processing unit of the simultaneous multithreaded computer system. The technique provides, in combination means for ascertaining an attribute for each of a plurality of threads, means for selecting at least one preferred thread from said plurality of threads in accordance with said attribute obtained by said ascertaining means and means for selecting among two or more of said plurality of threads if said attributes, corresponding to each of said two or more of said plurality of threads, are equal.

In accordance with multiple aspects of the invention, the attribute represents one of a likelihood that one or more instructions, belonging to said each of said plurality of threads, will be cancelled, a count of outstanding data cache misses, a count of instructions located in one of a subset of pipeline stages or a proximity of an instruction to a head of an instruction queue.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENTS

Figure 1:
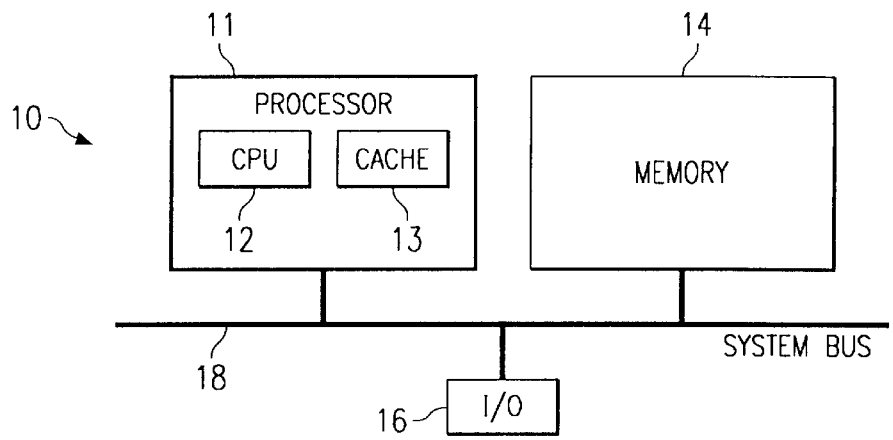
FIG. 1 is a block diagram of a computer system.
Figure 2:
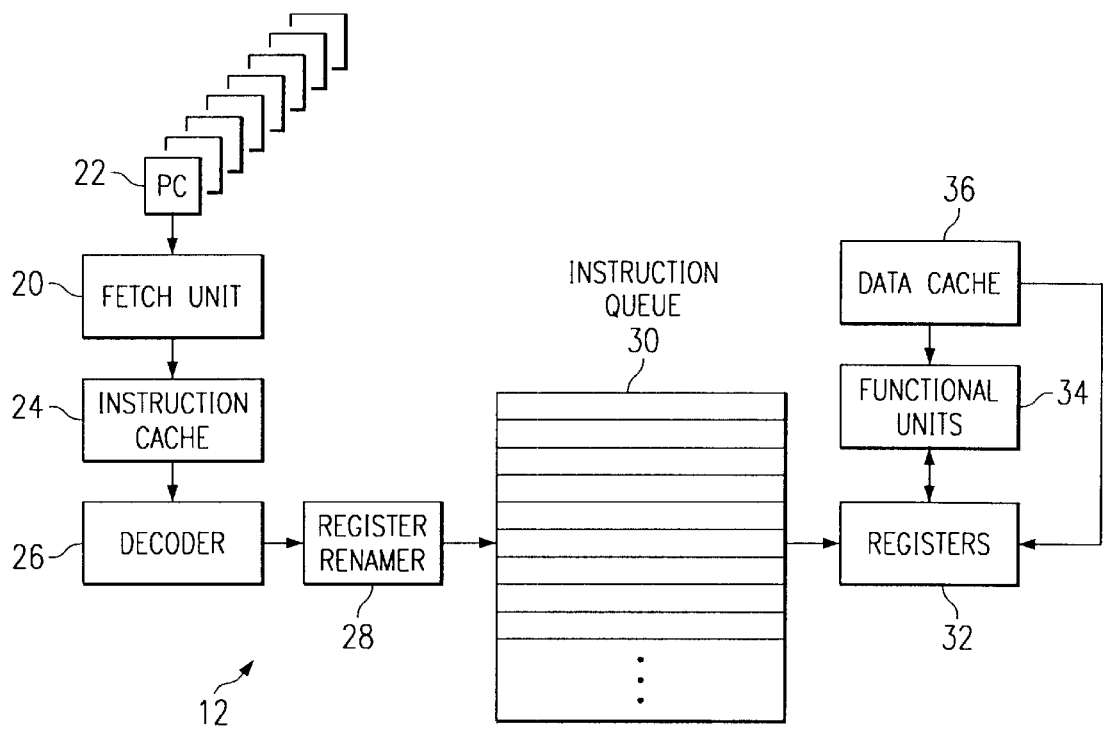
FIG. 2 is a block diagram of a simultaneous multithreaded, out-of-order execution CPU used in the computer system of FIG. 1.

Referring to FIG. 1, a computer system 10 is shown to include a processor module 11 which includes, inter alia, a central processing unit (CPU) 12 for processing an instruction stream and a cache system 13. Multiple stages of cache memory are provided such as a primary cache 24 (FIG. 2). The instruction stream, as well as data which is used by the CPU 12, are stored in a cache memory of the cache system 13 and/or in a main memory 14. The processor 11 and the memory 14 are coupled together via a system bus 18. Also coupled to the system bus 18 is Input/Output (I/O) interface 16. The I/O interface 16 enables the CPU 12 to communicate with external devices such as a printer.

A preferred implementation of the central processing unit (CPU) 12 will be described in conjunction with FIGS. 2–9. The described computer system 10 is a high speed pipelined computer system. That is, each functional portion of the CPU 12 is segmented into clocked stages that perform a portion of a given task. The pipeline of CPU 12 of computer system 10 will be discussed in conjunction with FIG. 3.

Referring now to FIG. 2, the CPU 12 is here, a simultaneous multithreaded, out-of-order execution processor. The CPU 12 is shown to include multiple program counters 22. Each program counter 22 identifies an address of an instruction within each thread currently executing within CPU 12. Here, eight program counters 22 are shown, one for each of eight threads executing in computer system 10. The CPU 12 also includes a fetch unit 20 which identifies which instructions to fetch from an instruction cache 24, for execution in the CPU 12.

The fetch unit 20 of the simultaneous multithreaded out-of-order execution processor 11 selects from among the eight program counters 22 to provide at least one address which is used by the simultaneous multithreaded, out-of-order execution processor 11 to fetch up to eight instructions per cycle from the Instruction cache 24.

In one embodiment of a simultaneous multithreaded, out-of-order execution processor a distinct fetch unit is included for each thread. The result of each of the fetches is merged before the instructions are executed. In the preferred embodiment of the CPU 12 however, only a single fetch unit 20 is provided. The mechanism by which the fetch unit 20 selects among the program counters 22 and hence, selects among the threads, to provide a fetch address will be discussed below.

During fetch, each instruction is provided with a unique instruction identifier. An instruction identifier is used, inter alia, to control the order in which instructions are completed, as well as to allow for the cancelling of instructions, in order, under certain circumstances. Events which cause instructions in the pipeline to be cancelled include a branch mispredict or an exception. Branch prediction mechanisms predict whether a branch will or will not be taken and thus provide an expected starting address of a next sequence of instructions. If the prediction made was not correct, the instruction pipeline is backed up to the branch instruction and the correct address of the next sequence of instructions is provided such that the instruction processor will choose the correct path. An exception occurs when an error occurs during execution of an instruction.

Both the completion of instructions and the cancelling of instructions are done on a per thread basis. Accordingly, each instruction is also provided a thread identifier which allows an instruction from one thread to be distinguished from instructions associated with another thread.

The fetched instructions are decoded by a decoder 26 and passed to register renaming logic 28. In the decoder 26, an instruction op code, the portion of the code which determines the function of the instruction, is examined to ascertain the function of the instruction and thus the resources needed by the instruction. Resources needed by the instruction may include general purpose registers within the CPU as well as functional units such as I/O units and arithmetic logic units and so forth. In addition, the decoder 26 organizes the information contained within the instruction to provide the instruction's information to subsequent units in an order preferred by the units.

The register renaming logic 28 maps the logical, architectural registers referenced in the instruction onto a pool of physical registers, thus removing register dependencies which occur when multiple instructions reference the same register while no information is shared by the instructions. The register renaming is done per thread. By mapping the architectural registers onto a pool of physical registers, each result may be written to a different register than the previous instruction's result, thus safeguarding against a current instruction's result overwriting a prior instruction's result prematurely.

Once the instructions from the different threads are redefined to operate on distinct physical registers, the instructions from different threads are combined into a single instruction queue 30. The instructions are held in the instruction queue 30 until they are issued. Here, a single instruction queue 30 is provided, however, it would be apparent to one skilled in the art that both an integer instruction queue as well as a floating point instruction queue may also be provided. As the operands of each instruction become available, the instructions are issued out-of-order to the appropriate functional unit 34. To determine when the operands of each instruction have become available, a valid bit is associated with each register and is set to indicate that the register has been written. Once the valid bits corresponding to the registers of an instruction's operands are set, and if the appropriate functional unit 34 is available, the instruction issues. The functional units 34 may include both floating point and integer units.

Once issued, the operands required by the instruction are accessed in the registers 32, as identified by the operand fields of the instruction. Here, a single register file 32 is shown however, separate floating point and integer register files may also be provided. The contents of the registers are provided to the appropriate functional unit 34 and the instruction is executed. The result of the execution of the instruction is written to the register 32 identified in the instruction or to cache or memory in the case of a store instruction.

Once execution of an instruction is complete, the instruction is retired in the order in which it occurred in the instruction stream. In order to retire the instructions in order, per thread, reference is made to the instruction identifier of each instruction and to the thread identifier. While the current instruction is progressing through the pipeline of the CPU, physical registers are assigned to the architectural registers referenced in the instruction. If the current instruction has assigned as its destination register, an architectural register referenced in the instruction to a physical register different than the architectural register was assigned in a previous instruction, once the current instruction has completed execution, the prior physical register assignment for that architectural register is no longer required, and that physical register can be made available for subsequent instructions.

Figure 3:
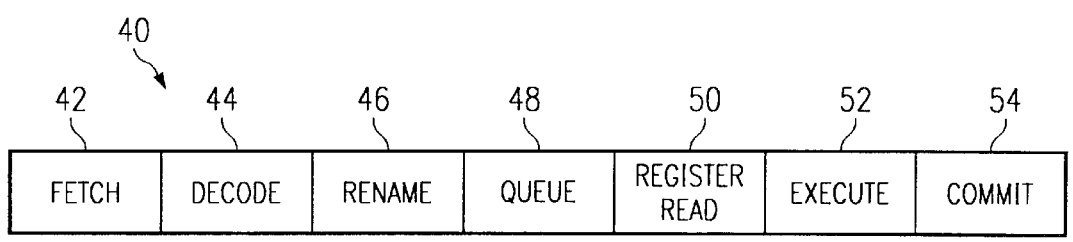
FIG. 3 is a diagram of a pipeline of the CPU of FIG. 2.

Referring now to FIG. 3, the pipeline 40 of CPU 12 is shown to include seven stages. Here, the first stage is an instruction fetch stage 42 in which instructions are fetched from instruction cache 24. In the fetch stage 42 of the pipeline, up to eight instructions are fetched from the instruction cache 24. Each instruction is assigned a unique number, called an instruction identifier, which is used to identify the instruction and its program order with respect to other instructions during the time the instruction is in flight. An instruction is considered to be in flight when it enters the fetch stage 42 and is no longer in flight once it is cancelled due to, for instance, a branch mispredict or once it has completed the commit stage 54 which will be discussed below. In addition, a thread identifier, which is used to identify the thread with which the instruction is associated, is also assigned to each instruction during the fetch stage 42.

After the fetch stage 42, the instruction is passed to the instruction decode stage 44. In the instruction decode stage 44, the opcode of the instruction is examined to ascertain the resources needed by the instruction. In the third stage of the pipeline 40, the rename stage 46, the logical, architectural registers of each instruction are mapped to a pool of available, physical registers. At the end of the rename stage 46, the instruction, with its associated instruction identifier and thread identifier, is placed in the instruction queue 30.

In the queue stage 48, an instruction is issued once its operands are available. During the register read stage 50, instructions issued in the queue stage 48 read their corresponding operands from the registers 32. In the sixth stage, the execution stage 52, instructions are executed within the functional units 34, in one or several execution stages, writing results into the general purpose registers 32 during the last execution stage. In the commit stage 54, the final stage of the pipeline 40, a given instruction is retired when it has executed to completion, and all previous instructions in the instruction's corresponding thread have been retired.

Figure 4:
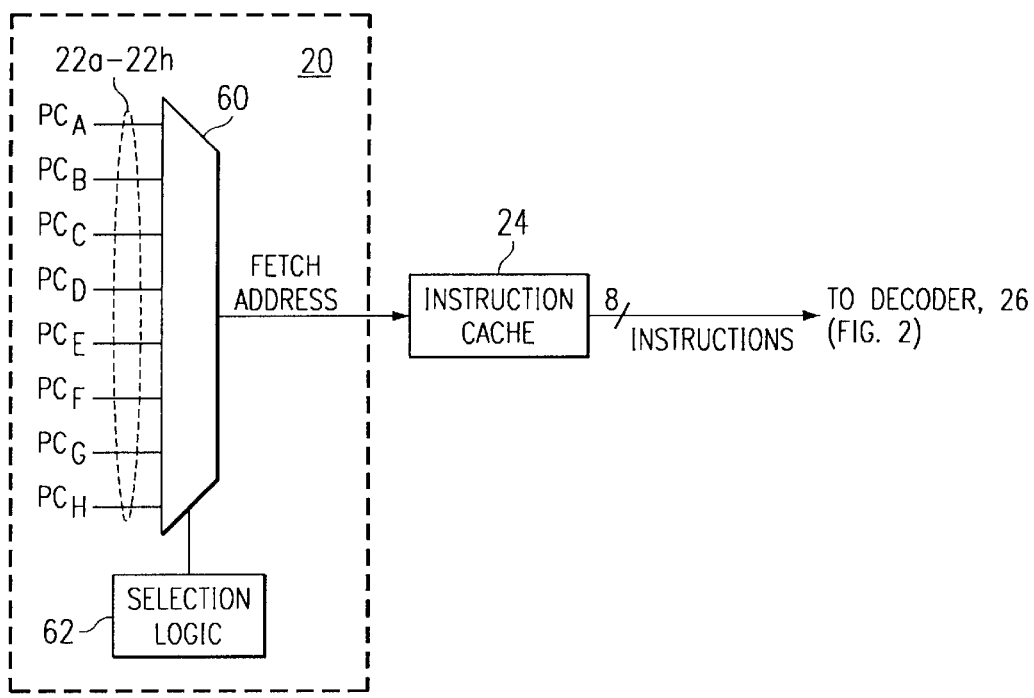
FIG. 4 is a block diagram of a first embodiment of a fetch unit for the CPU of FIG. 2.

Referring now to FIG. 4, a first embodiment of the fetch unit 20 of FIG. 2 is shown to include a multiplexer 60 and selection logic 62. Provided as input to multiplexer 60 are the program counters ($PC_A$ 22a, $PC_B$ 22b, $PC_C$ 22c, $PC_D$ 22d, $PC_E$ 22e, $PC_F$ 22f, $PC_G$ 22g, and $PC_H$ 22h) for each of the eight threads executing on computer system 10. The selection logic 62 identifies to the multiplexer 60 which of the eight program counters 22a–22h to provide to the instruction cache 24. From the fetch address provided by the multiplexer 60, up to eight instructions are fetched from the instruction cache 24 and provided to the decoder 26.

The selection logic 62 operates In accordance with any one of, or a combination of, multiple selection schemes. Here, the schemes will be described as being implemented prior to instruction fetch. It should be obvious to one of ordinary skill in the art however, that these schemes may also be implemented at alternative locations within the pipeline. For instance, in a case where instructions are fetched and stored in a buffer, the selection scheme may also be implemented subsequent to the buffering stage to provide a selection of instructions at this later stage in the pipeline.

Because not all threads executing within CPU 12 provide equally useful instructions in a particular cycle, it is advantageous to select instructions from a thread or threads which provide instructions which, when executing within the pipeline, have a beneficial impact on the CPU's performance. Here the selection schemes are responsive to information collected for each thread executing within CPU 12 which represent attributes of the thread.

These attributes represent, for example, a probability of an instruction from a thread subsequently being cancelled after it has entered the pipeline or a probability of a thread filling the instruction queue with unissuable instructions, thus restricting fetch and issue throughput. This restriction of fetch and issue throughput is typically referred to as instruction queue clog. These collected attributes are examined to make an educated selection of a subsequent thread from which to fetch instructions. A thread is selected if it is not suffering from an adverse attribute. That is, a thread would not be preferred for selection if it has a high probability of experiencing a branch mispredict, which would result in an instruction or instructions subsequently being cancelled, or if it has a high probability of causing an instruction queue clog.

In the present CPU 12, four conditional round robin selection schemes are provided. The conditional round robin schemes are referred to using a shorthand which follows the format of scheme_name.number_of_threads.number_of_instructions. Scheme name refers to the fetching scheme which is being implemented, here, RR is used to denote a round robin scheme. The number_of_threads and number_of_instructions fields refer to the number of threads from which instructions will be fetched and the number of instructions the fetch unit 20 will attempt to fetch from each thread as the designated number of instructions may not be available for fetch.

In the first conditional round robin scheme, designated as RR.1.8, eight instructions are fetched from a single thread during an instruction cycle. The thread is selected by a round robin scheme in which each of the threads are selected in order, however, a thread's availability to participate in the selection process is conditioned upon the thread not currently suffering from an adverse attribute, such as here, an instruction cache miss. The selection logic 62 includes a modulo N binary counter which cycles through each of the threads in turn.

The second and third conditional round robin schemes are designated as RR.2.4 and RR4.2. In RR.2.4, as many as four instructions are fetched from each of two threads, while in RR.4.2, two instructions are fetched each cycle from each of four threads. The threads are selected in a round robin priority scheme from those threads not suffering from an adverse attribute, such as here, an instruction cache miss.

The fourth conditional round robin scheme for thread selection is designated as RR.2.8. Here, as many as eight instructions are fetched from each of two threads. The fetched instructions are combined, taking as many as possible from the first thread and filling in with those fetched from the second thread, resulting in a total of eight instructions to be issued. As in each of the round robin schemes described above, the two threads are selected in a round robin priority scheme from those threads not currently suffering from an adverse attribute, such as here, an instruction cache miss.

The efficiency of the entire processor, however, is affected by the quality of instructions fetched. Two factors make one thread less desirable than another. The first factor is the probability that instructions in a thread will be cancelled from the pipeline requiring the pipeline, with respect to that thread, to be backed up. This type of situation occurs, for instance, where a thread is following a wrong path as a result of an earlier branch misprediction and the misprediction has not yet been discovered or as a result of a load/store reordering conflict. The second factor is the length of time the fetched instructions will be in the queue before becoming issuable, that is, the time before an instruction's operands become available. The second factor indicates a thread's inclination, due to current circumstances occurring within the processor, to cause instruction queue clog.

Selection rules have been developed by applying one or both of the two factors, to those instructions for each thread which are currently in flight, to select a preferred thread from which instructions should be fetched. Provided below are selection schemes which collect attributes of each thread to select a preferred thread or threads under those selection rules designated by the scheme.

One scheme for selecting a thread from which instructions are fetched determines a likelihood that an instruction or instructions from a thread will be cancelled. Because instructions occurring in the pipeline which are later cancelled can be seen to diminish the performance of the computer system 10 it would follow that by selecting a thread which is not prone to such behavior would provide the computer system 10 with preferred instructions which would correspondingly provide better performance to the computer system 10.

One such fetching scheme is designated as BRCOUNT. Under the BRCOUNT scheme, highest priority is given to those threads which are least likely to suffer from a branch mispredict, that is, those threads which are least likely to execute on a wrong path. As described above, a branch mispredict requires cancellation of all instructions within the pipeline belonging to the thread.

To determine which thread is least likely to suffer from a branch mispredict, branch instructions are counted that are in the decode stage 44, the rename stage 46 and the queue stage 48 of the pipeline. The thread which has the fewest branch instructions in these stages, and thus the fewest unresolved branches, is given highest priority.

An alternative fetching scheme for selecting a thread from which instructions are fetched is designated as MISSCOUNT. Under the MISSCOUNT scheme, highest priority is given to those threads which have the fewest outstanding data cache misses. This scheme addresses a problem which arises during long memory latencies which cause dependent instructions to back up in the instruction queue waiting for a load to complete. Eventually, these dependent instructions fill the instruction queues with instructions from a single blocked thread, causing what is typically referred to as instruction queue clog.

A general scheme for selecting a thread from which instructions are fetched gives priority to those threads having the fewest instructions in a subset of stages in the pipeline. One such scheme is designated as ICOUNT. Under the ICOUNT scheme, priority is given to threads with the fewest instructions in the decode stage 44, the rename stage 46 and the queue stage 48. This scheme provides a general solution to the instruction queue becoming clogged with instructions from a blocked thread.

An additional scheme which counts instructions in a subset of pipeline stages is designated as ECOUNT. Under the ECOUNT scheme, priority is given to threads with the fewest instructions in the fetch stage 42, decode stage 44, rename stage 46, queue stage 48, register read stage 50, execute stage 52 and the commit stage 54. Simply stated, the ECOUNT scheme gives priority to that thread having the fewest instructions in flight.

A final fetching scheme for selecting a thread from which instructions are fetched is designated as IQPOSN. Under the IQPOSN scheme, lowest priority is given to those threads with instructions closest to the head of the instruction queue 30. The instructions closest to the head of the instruction queue 30 are the oldest instructions. Threads with the oldest instructions are most prone to instruction queue clog. Accordingly, it is most beneficial to select for fetch those threads with instructions furthest from the head of the queue.

A count is provided for each thread executing within computer system 10 to implement each of the BRCOUNT, MISSCOUNT, ECOUNT and ICOUNT schemes. The count indicates the status of a thread in accordance with the current fetching scheme. Here, a bit vector is provided for each thread and is used to determine the count for that thread under each of the three above-named selection schemes. Under the IQPOSN scheme, a per thread bit vector is also provided to determine the location of a thread's instruction with respect to the head of the instruction queue.

Figure 5A:
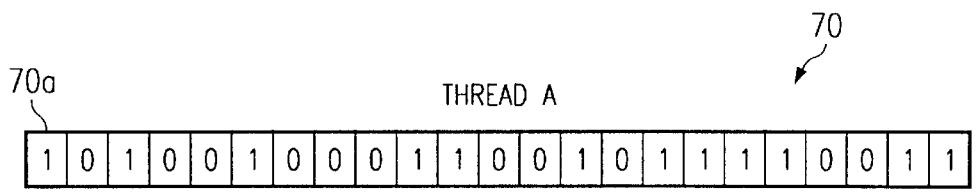
FIG. 5A is a block diagram of a first embodiment of a bit vector used to provide per thread information within the selection logic of FIG. 4.

Referring now to FIG. 5A, a thread A bit vector 70, used to implement the BRCOUNT, MISSCOUNT, ECOUNT and ICOUNT schemes, is shown to include an entry for each instruction from thread A resident in one of the pipeline stages of computer system 10. A similar bit vector is provided for each of the remaining threads B-H executing within computer system 10 and is used to collect information representing attributes for the thread in accordance with the currently implemented fetching scheme. Here, bit vector 70 is implemented as special purpose hardware, typically including a bank of set-reset flip flops.

The bit vector 70 is indexed by the instruction identifier, for each instruction. It should be noted here, that because the bit vector 70 is indexed by the instruction identifier, not all the indices within a single bit vector 70 will be used for that thread as instructions with sequential instruction identifiers may belong to different threads.

Operation of the bit vector 70 will be described first under the BRCOUNT scheme. As described above, the BRCOUNT scheme maintains a per thread count for each branch instruction from the thread located within the decode stage 44, rename stage 46 or queue stage 48. Referring back to FIG. 3, it can be seen that these three stages occur in succession.

As an instruction from thread A enters the decode stage 44, an entry, indexed by the instruction identifier for that instruction, is accessed in the bit vector 70. If the current instruction is a branch instruction, the corresponding bit is set. While the branch instruction is located within the decode stage 44, rename stage 46 or queue stage 48, the bit within the bit vector 70 corresponding to that instruction remains set. The count under the BRCOUNT scheme for thread A is the tally of all set bits in the bit vector 70. These set bits correspond to branch instructions presently in the decode stage 44, rename stage 46 or queue stage 48. Upon exiting the queue stage 48, the instruction's corresponding bit is cleared and accordingly, is no longer included in the count for thread A's BRCOUNT value. The thread having the lowest BRCOUNT value is selected.

The MISSCOUNT scheme maintains a count for each thread corresponding to the number of instructions suffering from a data cache miss. As described above, long memory latencies cause dependent instructions to back up in the instruction queue waiting, for instance, for a load to complete, eventually filling the queue with blocked instructions.

Under the MISSCOUNT scheme, an entry in bit vector 70, corresponding to the instruction and indexed by the instruction's instruction identifier, is accessed and set upon the instruction suffering a data cache miss. When an instruction makes a data request to memory, the CPU 12 checks to see if the data is located in the data cache 36 (FIG. 2). If the data is not located in the data cache 36 however, the instruction suffers a data cache miss and the instruction waits until the data is made available by fetching it from main memory 14 (FIG. 1). Once the instruction has been provided the data requested by it, the corresponding bit in the bit vector 70 is cleared. Thread A's MISSCOUNT value is determined by tallying up all set bits within the bit vector 70. The thread having the lowest MISSCOUNT value is selected.

Under the ICOUNT scheme, a count is maintained for each thread indicating the number of instructions for that thread currently located in the decode stage 44, rename stage 46 or queue stage 48. Here, the thread with the fewest instructions located in these three stages, which is not suffering from an instruction cache miss, is selected. This scheme achieves three purposes: first, it prevents any one thread from filling the instruction queue 30; second, it gives highest priority to threads that are moving instructions through the instruction queue 30 most efficiently; and third, it provides a more even mix of instructions from the available threads.

Here, an entry corresponding to the instruction identifier for an instruction is set in the bit vector 70 when the instruction enters the decode stage 44. While the instruction remains within the decode stage 44, rename stage 46 or queue stage 48 the bit remains set. Upon issuance of the instruction, that is, when the instruction exits the queue stage 48, the corresponding bit in the bit vector is cleared.

To determine the ICOUNT count for thread A therefore, a tally of all set bits within bit vector 70 is ascertained. In the ICOUNT scheme the thread having the lowest count is selected.

The bit vector 70, is implemented for the ECOUNT scheme in a manner similar to the implementation described for the ICOUNT scheme. Under the ECOUNT scheme however, an entry corresponding to the instruction identifier for an instruction is set in the bit vector 70 when the instruction enters the fetch stage 42. While the instruction remains within the decode stage 44, rename stage 46, queue stage 48, register read stage 50, execute stage 52 or the commit stage 54 the bit remains set. When the instruction completes the commit stage 54, and is thus no longer in flight, the corresponding bit in the bit vector is cleared.

To determine the ECOUNT count for thread A therefore, a tally of all set bits within bit vector 70 is ascertained. In the ECOUNT scheme the thread having the lowest count is selected.

Under the IQPOSN scheme, lowest priority is given to those threads with instructions closest to the head of the instruction queue 30 (FIG. 2). The instructions at the head of the instruction queue 30 are the oldest instructions and are most prone to instruction queue clog. Accordingly it would be most efficient to select for fetch a thread which has instructions furthest from the head of the instruction queue 30.

Figure 5B:
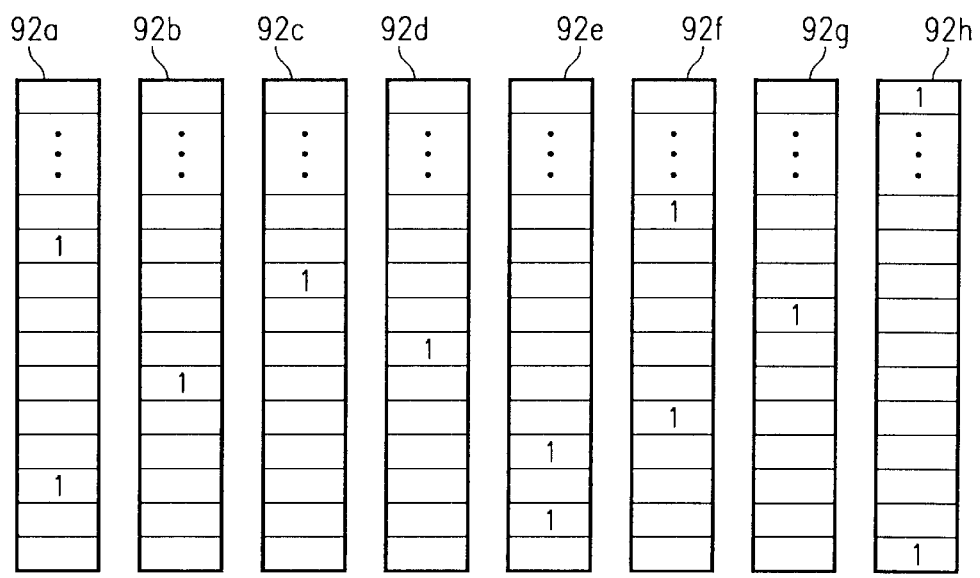
FIG. 5B is a block diagram of a second embodiment of a bit vector used to provide per thread information within the selection logic of FIG. 4.

Referring now to FIG. 5B, a bit vector 92a–92h for each of the threads executing within computer system 10 is shown. The entries in each of the bit vectors 92a–92h correspond to each location within the instruction queue 30 (FIG. 2) where an instruction is resident. That is, each bit vector includes a bit corresponding to each location in the instruction queue 30 currently occupied by an instruction. For each instruction in the instruction queue 30, a bit is set in the bit vector corresponding to the thread to which that instruction belongs. In this manner, the set bit indicates both the thread to which the instruction belongs as well as the instruction's location in the instruction queue relative to the head of the instruction queue. As instructions are removed from the instruction queue, the corresponding bit in the bit vector is cleared. In addition, as the location of the instruction in the instruction queue 30 changes so will the location of the set bit in the bit vector 92.

To determine which thread to select under the IQPOSN scheme, the bit vectors 92a–92h are first evaluated to determine the location of the leading instruction. That is, each bit vector 92a–92h is evaluated to determine at which location in the instruction queue 30, does the first instruction belonging to that thread reside. Typically, this is accomplished by traversing the bit vector 92a–92h and providing a set of corresponding leading bit vectors in each of which only a single bit is set, indicating the location of the instruction closest to the head of the instruction queue 30.

Once the location of the leading instruction for each thread has been determined, a similar evaluation is made across the leading bit vectors to determine, among each of the threads, the identity of the thread possessing the trailing instruction. That is, the leading bit vectors are compared to determine which thread possesses the leading instruction which is located furthest from the head of the instruction queue. Under the IQPOSN scheme, the thread which possesses the trailing instruction is selected. to Referring now to FIG. 6, a first embodiment of selection logic 62 is shown to include bit vectors 70a–70h for each thread executing within the simultaneous multithreaded, out-of-order execution processor 11 as well as count logic 80a–80h to determine the appropriate count for each thread.

Here, count logic 80a, associated with Thread A, is shown to include population count logic 82a which determines the number of bits set in bit vector 70a. The population count logic 82a is a first input to a multiplexer 86a which provides, at its output, one of two inputs based upon a recent abort signal 88a. The second input to multiplexer 86a is a default value 84a, the function of which will be discussed below. For each of the eight threads executing within the simultaneous multithreaded, out-of-order execution processor 11, separate count logic 80b–80h is provided which functions identically to count logic 80a.

Population count logic 82a accesses the bit vector 70a and determines a tally of all bits within the bit vector 70a which are set. Here, it matters not which of the attribute-based schemes are used to populate the bit vector 70a. The count determined by the population count logic 82a is provided as input to a multiplexer 86a.

Also provided as input to the multiplexer 86a is a default count value for thread A. The multiplexer 86a is provided a recent abort signal 88a which designates that a branch mispredict, an exception or some other condition has recently occurred within thread A causing all instructions resident within the pipeline of the simultaneous multithreaded, out-of-order execution processor 11 associated with thread A to be cancelled. Accordingly, the bit vector 70a is updated to reflect the cancelled instructions. Because this operation takes time and a current count for thread A may be required before the bit vector 70a has been fully updated a default value for thread A's count is provided.

Until the bit vector 70a has been completely updated to reflect the cancelled instructions, the recent abort signal 88a is asserted, directing the multiplexer to select the default value 84a to provide at the output of the multiplexer 86a. Typically, the default value 84a is set to zero which directs the fetch logic to select here, thread A. It is typically assumed that, since the instructions of thread A in the pipeline have been cancelled, thread A is the preferred choice from which to fetch subsequent instructions. When the recent abort signal 88a is not asserted, the multiplexer selects the output of the population count logic 82a to provide at the output of the multiplexer 86a.

Also included in the selection logic 62, is comparison logic 90 which compares the counts provided by each thread's count logic and selects the appropriate thread in accordance with the attribute-based fetching scheme currently in place. In the case of a tie between two threads, a round robin policy is implemented fetching from a first thread in a first fetch cycle and selecting from a second thread in the subsequent fetch cycle.

Figure 7:
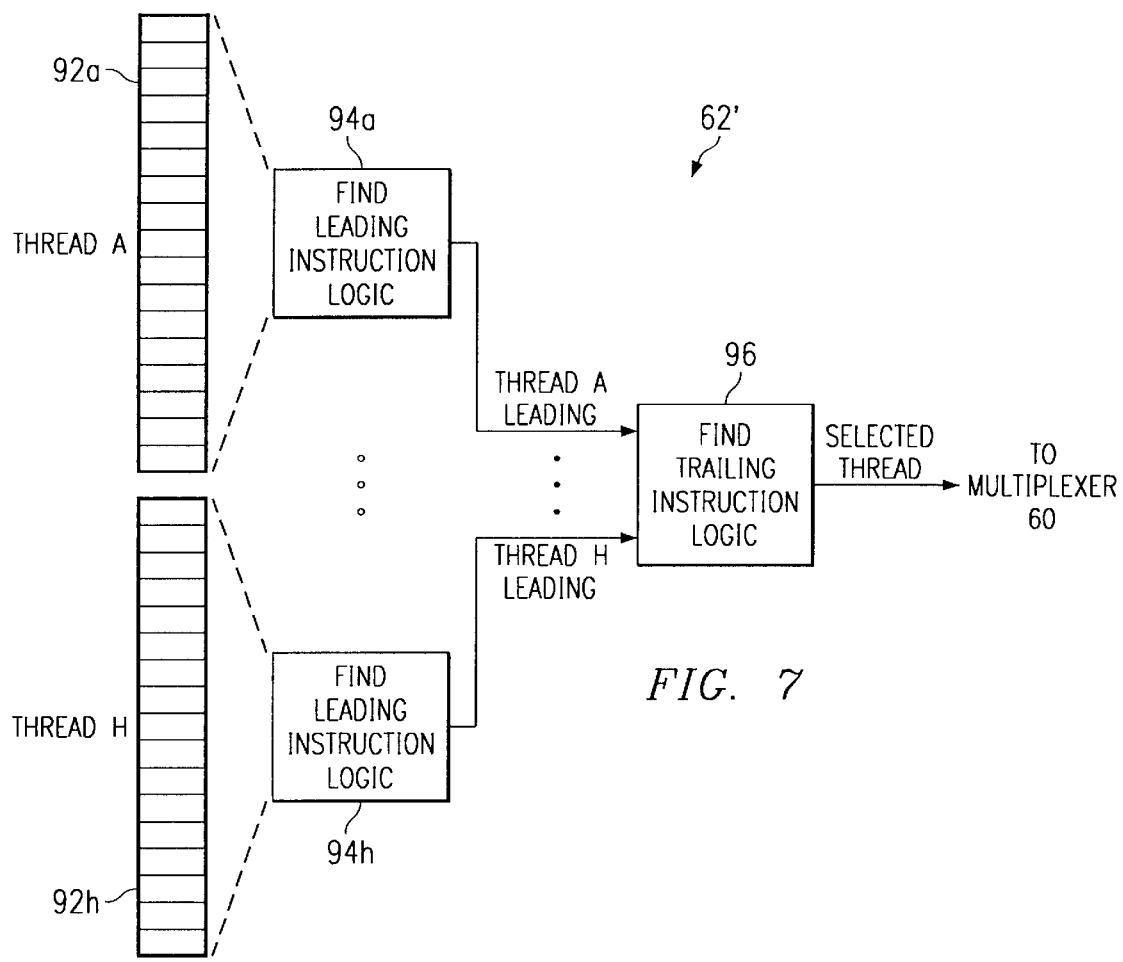
FIG. 7 is a block diagram of a second embodiment of the selection logic of FIG. 4.

Referring now to FIG. 7, a second embodiment of selection logic 62' is shown to include bit vectors 92a–92h (FIG. 5B) for each thread executing within the simultaneous multithreaded, out-of-order execution processor 11. Each bit vector 92a–92h indicates a location within the instruction queue 30 of each instruction belonging to that thread. The bit vectors 92a–92h are provided as input to the find leading instruction logic 94a–94h.

Here, the find leading instruction logic 94a–94h determines for each thread, the location of an instruction belonging to that thread which is located, within the instruction queue 30, closest to the head of the instruction queue 30. Here, this is accomplished, for example, for thread A, by evaluating the bit vector 92a and determining the location of the first set bit in the bit vector 92a. To determine the leading instruction, the bit vector is traversed beginning at an end of the bit vector corresponding to the head of the instruction queue 30, resulting in a leading bit vector 92a' (not shown) in which the only set bit corresponds to this leading instruction. A similar process is performed for each of the remaining threads resulting in leading bit vectors 92b'–92h' (not shown).

These leading bit vectors 92a'–92h' are provided as input to the find trailing instruction logic 96 which determines the thread which possesses a leading instruction furthest from the head of the instruction queue 30. This is accomplished here, by comparing the leading bit vectors 92a'–92h' to determine which set bit trails the set bits in the remaining leading bit vectors 92a'–92h', and is thus furthest from the head of the instruction queue 30. The output of the find trailing instruction logic 96 is the selected thread which is provided to multiplexer 60 (FIG. 4).

Figure 8A:
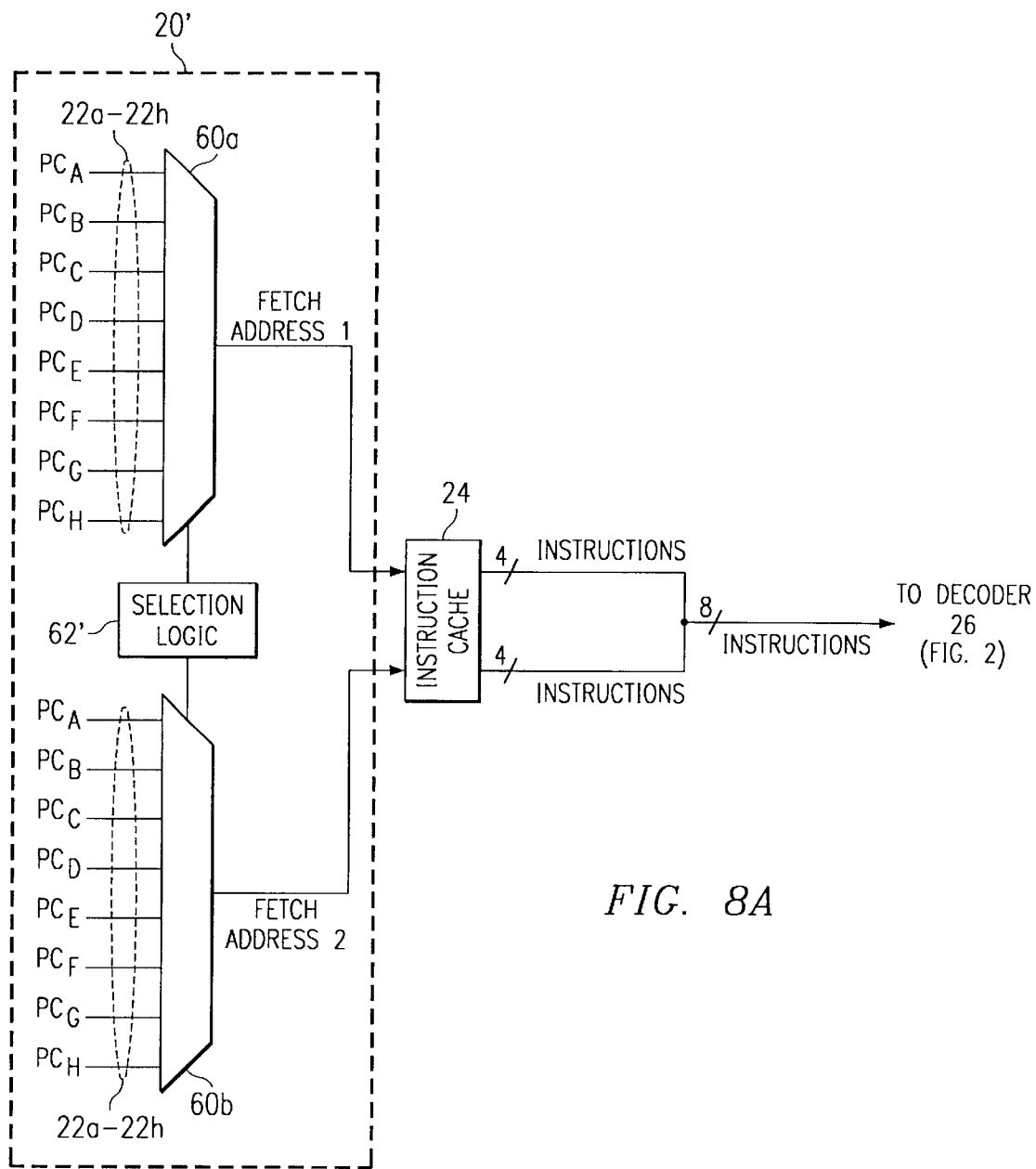
FIG. 8A is a block diagram of a second embodiment of the fetch unit for the CPU of FIG. 2.

Referring now to FIG. 8A, a second embodiment of the fetch unit 20' of FIG. 2 is shown to include a first multiplexer 60a and a second multiplexer 60b. Provided to each multiplexer 60a, 60b are the program counters 22a–22h for each of the eight threads executing on the simultaneous multithreaded, out-of-order execution processor 11 of FIG. 1.

In the second embodiment of the fetch unit 20', instructions are fetched from two threads during a single fetch cycle. It will become apparent to one skilled in the art that the structure of fetch unit 20' can also be expanded to fetch from three or more threads in a single cycle as well.

With regard to the selection logic 62' provided in the second embodiment of the fetch unit 20', either the RR.2.4 round robin scheme or any of the attribute-based selection schemes may be implemented. Here, each of the attribute-based schemes select two threads per cycle rather than a single thread. A signal corresponding to one of each of the selected threads is provided to the first multiplexer 60a and the second multiplexer 60b respectively. Under the RR.2.4 scheme, the first multiplexer 60a is provided with the identity of the first thread selected and the second multiplexer 60b is provided with the identity of the second thread selected by the scheme.

Figure 8B:
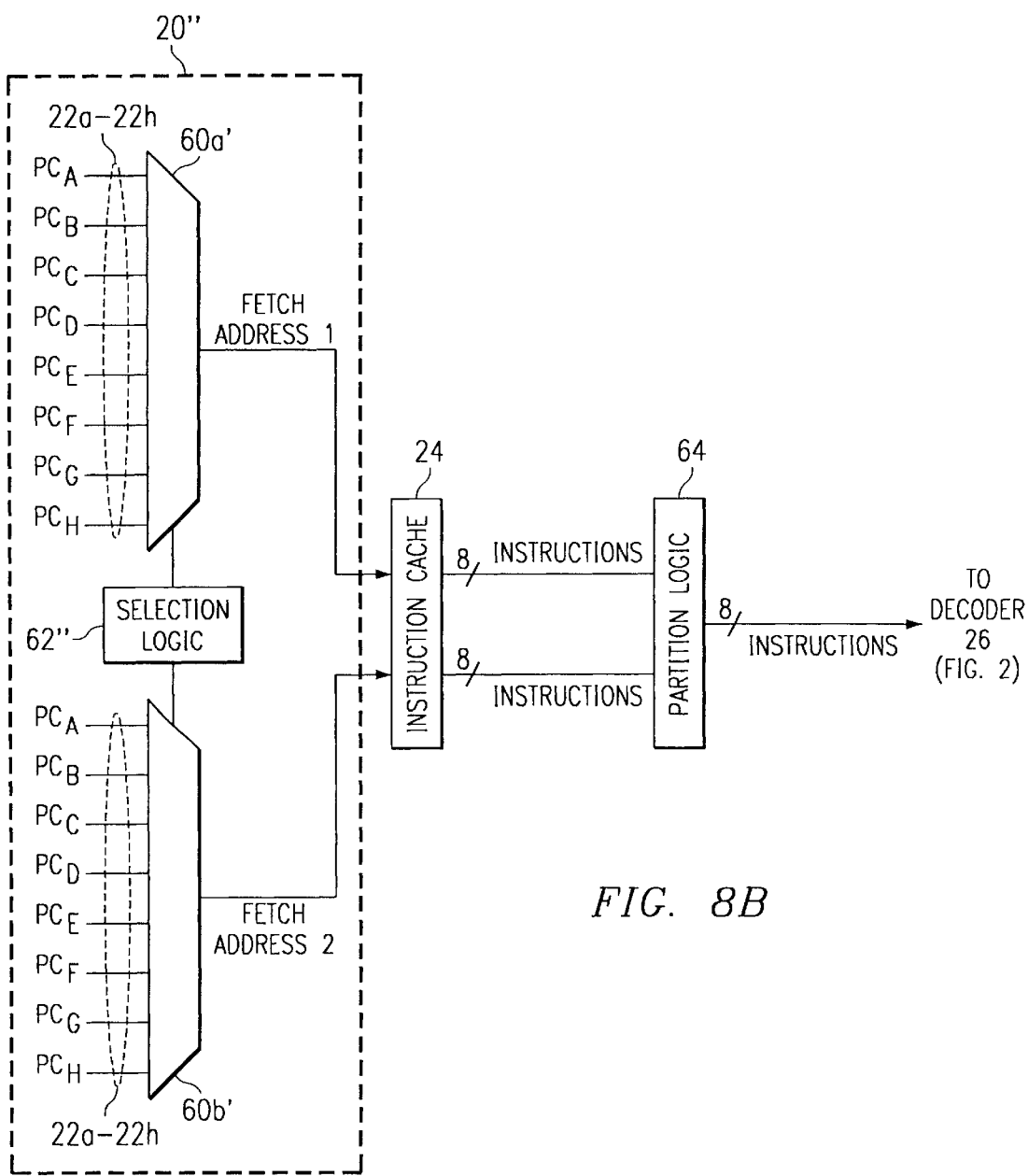
FIG. 8B is a block diagram of a third embodiment of the fetch unit for the CPU of FIG. 2.

The selection logic 62' identifies to the first multiplexer 60a one of the eight program counters 22a–22h to provide to the instruction cache 24. From fetch address 1 provided by the multiplexer 60, four instructions are fetched from the instruction cache 24. The selection logic 62' also identifies to the second multiplexer 60b a second one of the eight program counters 22a–22h which is also provided to the instruction cache 24. From fetch address 2, four additional instructions are fetched from the instruction cache 24. It should be noted that in some instances, fetch address 1 and fetch address 2 will address instructions belonging to the same thread. Referring now to FIG. 8B, a third embodiment of the fetch unit 20" of FIG. 2 is shown to include a first multiplexer 60a' and a second multiplexer 60b'. Provided to each multiplexer 60a', 60b' are the program counters 22a–22h for each of the eight threads executing on the simultaneous multithreaded, out-of-order execution processor 11 of FIG. 1.

The selection logic 62" identifies to the first multiplexer 60a' one of the eight program counters 22a–22h to provide to the instruction cache 24. From fetch address 1 provided by the multiplexer 60a', up to eight instructions are fetched from the instruction cache 24. The selection logic 62" also identifies to the second multiplexer 60b' a second one of the eight program counters 22a–22h which is also provided to the instruction cache 24. From fetch address 2 up to eight additional instructions are fetched from the instruction cache 24. Again, as stated previously, it should be noted that in some instances, fetch address 1 and fetch address 2 will address instructions belonging to the same thread.

Input to the partition logic 64 are the two sets of up to eight instructions fetched from instruction cache 24. The partition logic 64 determines which of these sixteen instructions will be provided to the decoder 26 (FIG. 2). There are multiple partition policies which may be implemented.

Firstly, the partition logic 64 can select all of the instructions identified by fetch address 1 and use the instructions identified by fetch address 2 if necessary to provide a total of eight instructions to the decoder 26. That is, if fetch address 1 identifies a total of six instructions, the first two instructions identified by fetch address 2 can also be provided to the decoder 26 to provide a total of eight instructions.

Secondly, the partition logic 64 can select the first four instructions identified by fetch address 1 and select the first four instructions identified by fetch address 2 to provide a total of eight instructions to the decoder 26. In addition, other weights may also be assigned to each of the fetch addresses, that is, selecting 75% of the eight total instructions from fetch address 1 and selecting the remaining 25% of the total instructions from fetch address 2. It should be noted that these weights may be assigned either statically or dynamically in response to feedback logic.

With regard to the selection logic 62" provided in the third embodiment of the fetch unit 20", either the RR.2.8 round robin scheme or any of the attribute-based selection schemes may be implemented. Here, each of the attribute-based schemes select two threads per cycle rather than a single thread. A signal corresponding to one of each of the selected threads is provided to the first multiplexer 60a' and the second multiplexer 60b' respectively. The partition logic 64 may be configured to implement any of the above discussed partitioning schemes.

To implement the RR.2.8 scheme, each multiplexer 60a', 60b' is again provided with the identity of the. next two threads. Here, however, the partition logic 64 is configured to provide all of the instructions identified in the first thread and to "fill in" from the instructions identified in the second thread to provide a total of eight instructions.

As discussed above, it would be apparent to one of skill in the art to expand the functionality of the second and third embodiments of the fetch unit 20', 20" to provide instructions fetched from three or more threads. For instance, the RR.4.2 scheme could be implemented in a manner consistent with that which is described above using four multiplexers to select four threads for fetch. The partition logic 64 of the third embodiment of the fetch unit 20" could be configured to select, in some manner, eight instructions from those identified by the four program counters selected or, conversely, if the second embodiment of the fetch unit 20' was implemented, no additional partitioning logic would be included as two instructions would be selected from each of the four identified threads.

Conversely, the selection schemes can be combined in a manner in which one scheme is used to select fetch address 1 while a second fetching scheme is used to select fetch address 2.

Figure 9:
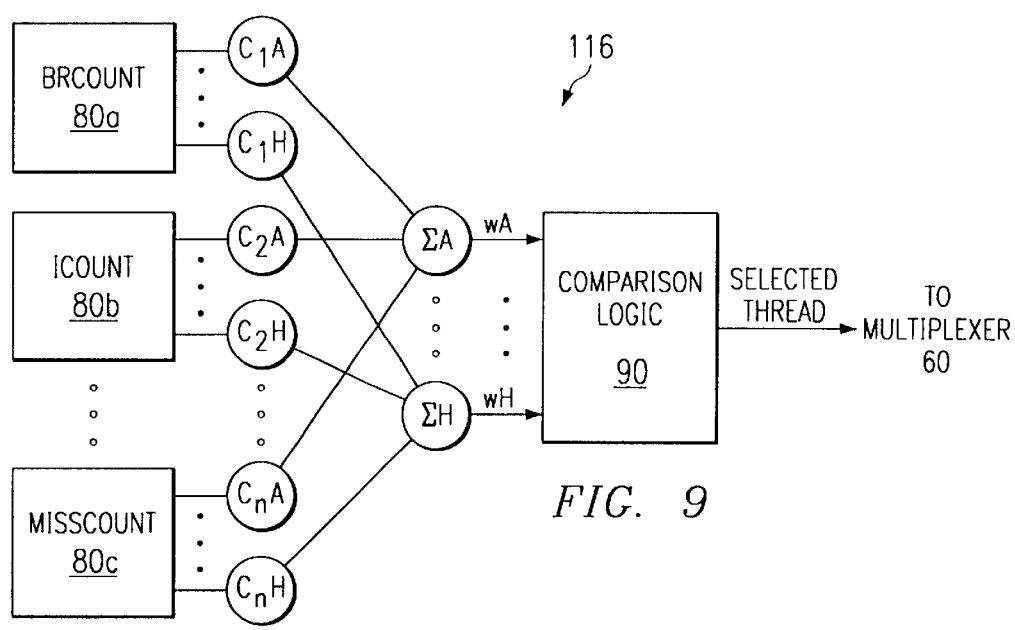
FIG. 9 is a block diagram of a weighted fetch scheme.

Referring now to FIG. 9, a weighted fetch scheme 116 to determine a weighted thread count for each thread is shown to include count logic 80a, to provide a thread count for each thread executing within the simultaneous multithreaded, out-of-order execution processor 11 under the BRCOUNT fetching scheme Here, additional count logic means 80b, 80c, are also included to provide thread counts under the ICOUNT and MISSCOUNT selection schemes as well. The BRCOUNT, ICOUNT and MISSCOUNT schemes have been selected for illustrative purposes only as any two or more of the schemes may be used to implement the weighted fetch scheme 116.

Figure 6:
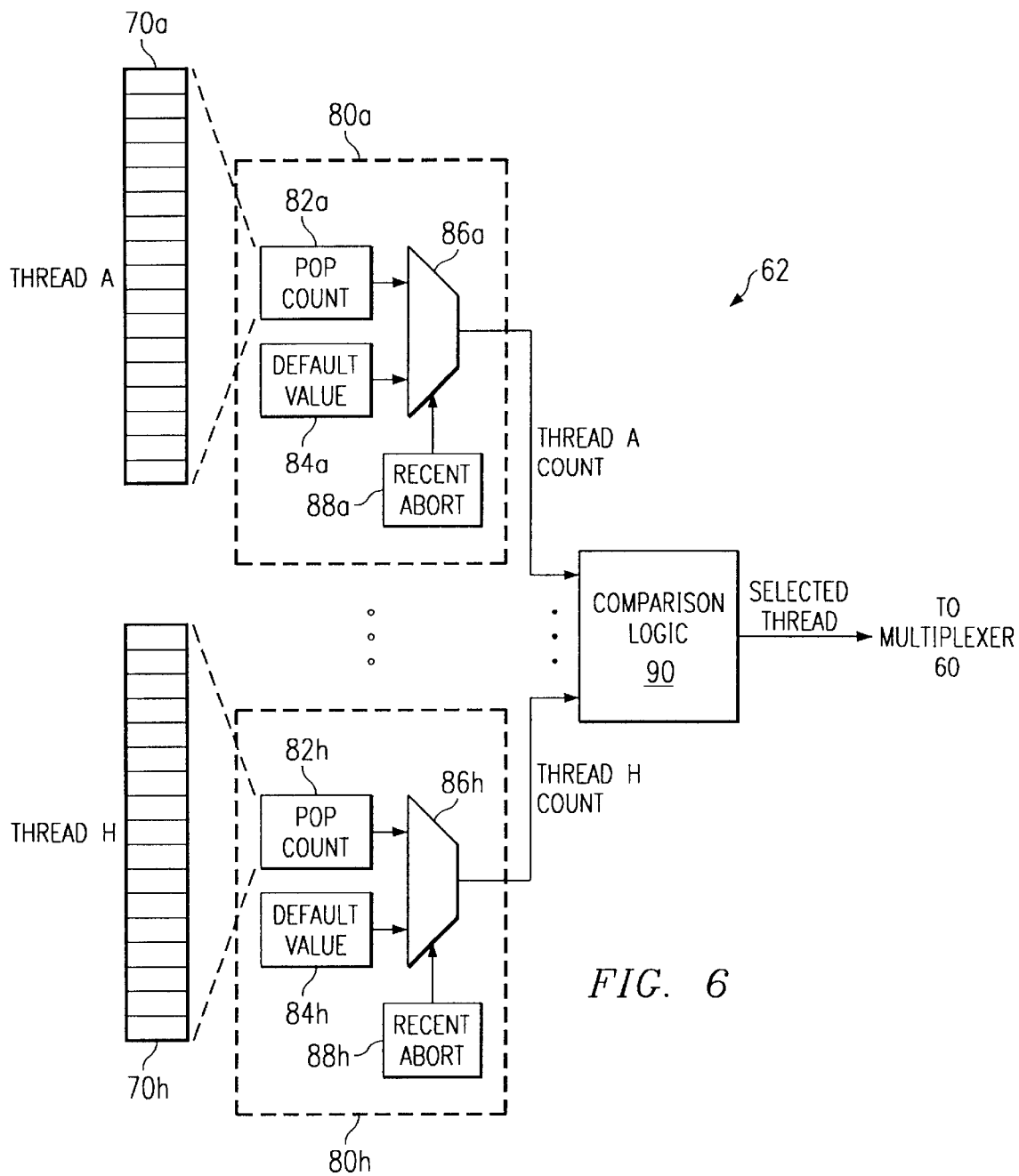
FIG. 6 is a block diagram of a first embodiment of the selection logic of FIG. 4.

Under the weighted fetch scheme 116, the count logic 80a of FIG. 6 operates identically to the operation described in FIG. 6, which references the operation of the first embodiment of the selection logic 62. That is, a population count 82 of the corresponding bit vector 70 is provided as input to multiplexer 86 and, depending upon whether the recent abort signal 88 is asserted, either the population count 82 or a default value 84 is provided at the output of the multiplexer 86 as the thread count for the corresponding thread. Here, for each of the count logic means 80 depicted, the bit vector 70 would be populated in view of the BRCOUNT, ICOUNT and MISSCOUNT schemes.

At the output of the count logic 80, the thread count for each thread is multiplied by a constant, $C_1$, $C_2$ and $C_n$, corresponding to each of the selection schemes, where the constant represents the apparent value of each fetching scheme in reference to each other. That is, the scheme which typically selects the preferred thread for fetch would have a lesser weight assigned to it and thus, the thread count determined under that scheme would be multiplied by a smaller constant value. The results from the multiplication process are summed to determine a weighted thread count for each thread. The lower the count, the more likely that thread is to be selected. These weighted thread counts are then provided to comparison logic 90 which signals the multiplexer 60, (FIG. 4) to provide the appropriate fetch address to the instruction cache 24. Here again, it should be noted that these weights may be assigned either statically or dynamically.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A multi-threaded processor comprising:
   a pipeline including a number of stages, each stage processing one or more instructions, the instructions belonging to a plurality of threads;
   a buffer located between adjacent stages in the pipeline, the buffer storing a plurality of instructions, the stored instructions being from different ones of the plurality of threads;
   count logic to store count information relating to each of the plurality of threads, the count information indicating the number of instructions in each of the corresponding threads that have a particular attribute; and
   a selection logic circuit with an output coupled to the buffer, the selection logic circuit to determine which instruction is to be read from the buffer based on the count information stored by the count logic.

2. The processor of claim 1 and further comprising a memory to store a plurality of thread bit vectors, each of the thread bit vectors including a plurality of bits and being associated with a corresponding one of the threads, each bit being associated with a corresponding instruction, each thread bit vector storing attribute information for the corresponding one of the threads, the count logic determining the count information from the thread bit vectors.

3. The processor of claim 1 wherein count logic maintains count information for each thread, the count information indicating the number of instructions for each thread located in one or more pipeline stages.

4. The processor of claim 3 wherein the selection logic selects the thread with the fewest number of instructions located in the one or more pipeline stages.

5. The processor of claim 1 wherein the count information provides information relating to a likelihood that one or more instructions belonging to each of the threads will be cancelled.

6. The processor of claim 5 wherein the count information provides information relating to a count of unresolved branch instructions.

7. The processor of claim 1 wherein the count information provides information relating to a count of outstanding data cache misses.

8. The processor of claim 1 and further comprising:

a cache memory;

a decoder coupled to receive instructions from the memory;

a fetch unit coupled to an addressing input of the cache memory to select which instructions are provided from the memory to the decoder;

a second count logic to store count information relating to each of the plurality of threads, the count information indicating the number of instructions in each of the corresponding threads that include a certain characteristic; and a second selection logic circuit with an output coupled to the fetch unit, the second selection logic circuit to determine which instruction is to be fetched from the memory based on the count information stored by the count logic.

* * * * *